United States Patent [19]

Schutten et al.

[11] 4,431,958

[45] Feb. 14, 1984

[54] CONTROL APPARATUS FOR SINGLE PHASE AC INDUCTION MOTOR

[75] Inventors: Herman P. Schutten, Milwaukee; Jan K. Sedivy, Elm Grove; Robert W. Sackett, Milwaukee, all of Wis.

[73] Assignee: Eaton Corporation, Cleveland, Ohio

[21] Appl. No.: 403,250

[22] Filed: Jul. 29, 1982

Related U.S. Application Data

[63] Continuation-in-part of Ser. No. 230,080, Jan. 30, 1981.

[51] Int. Cl.³ .............................................. H02P 5/40
[52] U.S. Cl. ................................... 318/816; 318/809; 318/812
[58] Field of Search ............... 318/812, 767, 768, 816, 318/817, 747, 701, 809, 749; 310/10, 148, 755, 779

[56] References Cited

U.S. PATENT DOCUMENTS

| | | | |
|---|---|---|---|
| Re. 29,275 | 6/1977 | Berman | 318/798 |
| 2,664,533 | 12/1953 | Raab | 318/812 |
| 3,039,039 | 6/1962 | Levine | 318/701 |
| 3,389,315 | 6/1968 | Andreas et al. | 318/779 |
| 3,487,345 | 12/1969 | Watrous et al. | 307/252 B |
| 3,564,364 | 2/1971 | Neff | 318/809 |
| 4,060,754 | 11/1977 | Kirtley, Jr. | 318/768 |
| 4,078,192 | 3/1978 | Fultz | 318/799 |
| 4,300,077 | 11/1981 | Katz et al. | 318/768 |

Primary Examiner—David Smith, Jr.
Attorney, Agent, or Firm—C. H. Grace; M. E. Taken

[57] ABSTRACT

A control for establishing a rotating field in a single phase AC induction motor (10) having a rotatable output and first (12) and second (14) sets of mechanically displaced windings which are energized alternately and cyclically by a single phase AC input for establishing the rotating field to effect rotation of the output. The control includes a single phase AC input, first and second solid state switch means, 18, 20, for interconnecting the first and second sets of windings, respectively, of the motor with the AC input. The first and second switch means when conductive apply energy from the input to the first and second sets of windings, respectively, and when non-conductive prevent the application of energy from the input to the first and second set of windings, respectively. A controller (26) is provided responsive to the single phase AC wave form for controlling the conduction of the first and second switch means and rendering each of the switch means alternately and cyclically conductive for discrete time periods during each cycle of the single phase AC wave form on the input.

14 Claims, 10 Drawing Figures

CONTROL APPARATUS FOR SINGLE PHASE AC INDUCTION MOTOR

This application is a continuation-in-part of copending application for U.S. Pat. Ser. No. 230,080, filed Jan. 30, 1981.

BACKGROUND OF THE DISCLOSURE

1. Field of the Invention

The present invention relates to a control apparatus for establishing a rotating field in a single phase AC induction motor by alternately and cyclically connecting a source of single phase AC for discrete time periods during each cycle to first and second sets of mechanically displaced windings in the motor so as to apply a partial sine wave voltage to each of the windings of the motor, to establish a magnetic field in each set of windings and wherein the resultant sum of the two magnetic fields is a rotating field which traverses the poles of the motor during each full cycle of the AC line.

2. Prior Art

The prior art includes known systems for converting a single phase input to a plural phase output. In known phase converters which are utilized with AC induction motors, the phase shift is generally accomplished through the use of inductors, capacitors, resistors, and/or combination thereof. For example, the Smith U.S. Pat. No. 2,673,954 discloses a phase converter which utilizes a capacitor to advance the phase and an inductor to retard the phase and the Hyman U.S. Pat. No. 4,103,325 discloses a single phase to three phase converter wherein an RC circuit and an operational amplifier is utilized to shift phases. The use of circuit elements such as inductors, capacitors, and resistors is a costly way of shifting phases and only approximates the desired phase shift for running and starting an AC induction motor. The Katz U.S. Pat. No. 3,991,353 discloses a method and a motor apparatus for generating high speeds by converting an input frequency to a higher output frequency. Katz does not control a standard single phase AC induction motor. The Buffington U.S. Pat. No. 3,349,316 and the Irish U.S. Pat. No. 3,959,709, both disclose converter systems which convert single phase to multiple phases. Buffington utilizes capacitors and inductors for phase shifting and Irish utilizes solid state switch means which are switched to accomplish phase shifting.

BACKGROUND OF THE INVENTION

Accordingly, it is a provision of the present invention to provide a new and improved control apparatus for establishing a rotating field in a single phase AC induction motor having a rotatable output and first and second sets of mechanically displaced windings which are energized alternately and cyclically by a single phase AC input to establish a rotating field to effect rotation of the output.

Another provision of the present invention is to provide a new and improved control apparatus as set forth in the preceeding paragraph including a single phase AC input, first solid state switch means for interconnecting the first set of windings of the motor and the single phase input, second solid state switch means for interconnecting the second set of windings of the AC motor and the single phase AC input, the first switch means when conductive applying energy from the input to the first set of windings and when non-conductive preventing the application of energy from the input to the first set of windings, the second switch means when conductive applying energy from the input to the second set of windings and when non-conductive preventing the application of energy from the input to the second set of windings and controller means responsive to the single phase AC wave form applied to the input for controlling the conduction of the first and second switch means and rendering each of the first and second switch means alternately and cyclically conductive for discrete time periods during each cycle of the single phase AC wave form on the input.

Still another provision of the present invention is to provide a new and improved control as set forth in the preceding paragraph wherein the discrete time period for which the first switch means conducts is not coextensive with the discrete time period for which the second switch means conducts and the current in one of the first and second windings is increasing and the current in the other of the first and second windings is decreasing during each discrete time period.

A further provision of the present invention is to provide a control apparatus for establishing a rotating field in a single phase AC induction motor having a rotatable output and first and second sets of mechanically displaced windings which are energized by a single phase AC input to establish a rotating field including a single phase AC input, solid state switch means for interconnecting the first set of windings of the motor to the single phase AC input, means for connecting the second set of windings continuously to the single phase AC input, the solid state switch means when conductive applying energy from the input to the first set of windings and when non-conductive preventing the application of energy from the input to the first set of windings, and controller means responsive to the single phase AC wave form applied to the input for controlling the conduction of the switch means for rendering the switch means cyclically conductive for discrete time periods during each cycle of the single phase AC wave form on the input and wherein the current in the second set of windings which are continuously energized lags or leads the current in the first set of windings during each of the discrete time periods to establish a rotating magnetic field in the motor.

DESCRIPTION OF THE PREFERRED EMBODIMENT

Figure 1:
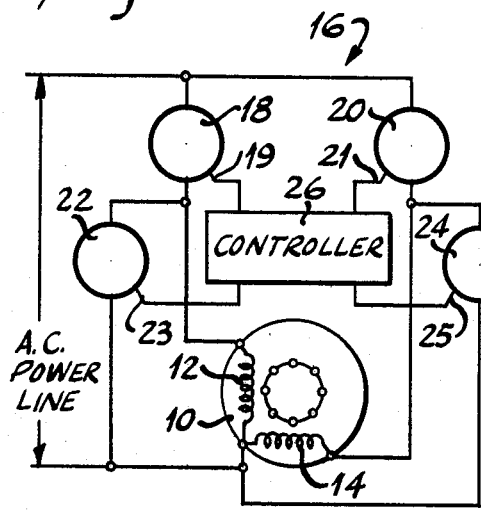
FIG. 1 is a schematic diagram of a preferred embodiment of the control apparatus.

Referring to the Figures, and more particularly to FIG. 1, a control apparatus 16 for single phase AC induction motor 10 is disclosed. A single phase induction motor is an induction motor intended for operation from a single phase alternating current power source. An induction motor with a single winding will run, but it will not start from rest. Single phase induction motors commonly have a second, or start, winding energized differently from the run winding to start the motor from rest with the correct direction of rotation. The start winding is frequently disconnected or connected in another different way as soon as the motor is started and running. Thus, paradoxically, a single phase induction motor is frequently constructed similarly to a two phase induction motor. The single phase AC induction motor 10 includes a first set of windings 12 and a second set of windings 14. The sets of windings 12 and 14 have been schematically illustrated as single windings 12 and 14, but it should be appreciated that either single windings or sets of related windings could be utilized in a well known manner in the construction of the motor 10. The windings 12 and 14 are mechanically spaced apart as is schematically illustrated in FIG. 1. Preferably, the windings 12 and 14 are mechanically spaced apart in quadrature at an angle of 180 divided by P where "P" is the number of magnetic poles with which the motor is wound. Generally, the winding 12 can be thought of as a "start" winding while the winding 14 is the "run" winding. The specific construction of the motor 10 is disclosed in the prior art and the motor itself does not form a part of the present invention. However, it should be appreciated that wire size and winding details may be varied to optimize performance of the motor 10 with the control apparatus 16 of the present invention.

The control apparatus 16 is provided for alternately and cyclically applying and removing AC line power to the windings 12 and 14 of the motor 10. The control apparatus 16 includes a first solid state switch means 18 which is series connected with the winding 12 and a second solid state switch means 20, which is connected in series with winding 14. Each of the solid state switches 18, 20 include a gate terminal 19, 21, respectively, which, when a gate signal is applied thereto, effects conduction of the associated solid state switch. The controller 26 is provided for establishing gate signals to effect conduction of the switches 18 and 20. The controller 26 may include inputs, not illustrated, which are responsive to the AC wave form on the AC power line and any other inputs which may be useful in controlling the motor 10. The controller 26 which is schematically illustrated in black box form may include electronic circuitry, microprocessors, and/or any other useful circuitry capable of actuating switches 18, 20, 22 and 24. Controller inputs which are not shown can include line voltage and other useful inputs which could be useful for controlling the conduction of the main switches 18, 20. For example, power on/off, reversing, starting, over-temperature sensing could all be accomplished with the controller 26 which would then allow conduction of the main switches in dependence upon the sensed signals.

The alternate and cyclic application of AC line power to the windings 12 and 14 upon cycling the switches 18, 20 establishes a rotating magnetic field in the spaced apart windings 12, 14. Solid state switches 22 and 24 are disposed in parallel to the windings 12 and 14, respectively, and also have their gates 23, 25 connected to the controller 26. The switch 22 is operable to conduct upon the application of a gate signal to gate 23 from controller 26 when switch 18 is not conducting to allow energy inductively stored in winding 12 to gradually decrease through the "free wheeling" switch 22 which shorts winding 12 when conducting. The switch 24 is rendered conductive upon the application of a gate signal to the gate 25 of switch 24 by the controller 26 when the switch 20 is non-conductive and allows the energy inductively stored in winding 14 to gradually decrease through the "free wheeling" switch 24 which shorts winding 14 when switch 24 conducts.

When switch 18 conducts, full voltage is applied from the AC power line, through switch 18 and through the winding 12. When switch 20 conducts, full voltage is applied from the AC power line, through switch 20 and through the winding 14 to the AC power line. When switch 18 is non-conductive, switch 22 is rendered conductive to short winding 12 and allows the inductive energy stored in winding 12 to bleed therefrom through switch 22. When switch 24 is conducting, the switch 20 is non-conductive, switch 24 shorts winding 14 and allows the inductive energy stored therein to bleed through conducting switch 24.

Figure 9:
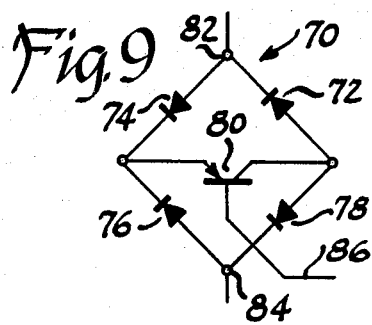
FIG. 9 is a schematic representation of a preferred solid state switch means which may be utilized in the embodiments of FIGS. 1 and 2.

Each solid state switch 18, 20, 22, 24 may be comprised of various elements or networks which provide for bidirectional current flow therethrough in response to a gate signal. FIG. 9 shows an example of a desirable solid state switch which could be utilized for the solid state switches 18, 20, 22, 24. In FIG. 9 the solid state switch 70 includes four diodes 72, 74, 76 and 78 disposed in a bridge rectifier configuration and a transistor 80 connected across the rectifier bridge. The diodes 72, 74, 76 and 78 are connected so that when transistor 80 is non-conductive no current can flow in either direction between points 82 and 84. The transistor 80 has a base lead 86 which is connected to the controller 26. When a gate signal is applied to the base of transistor 80 via the base lead 86 from controller 26, transistor 80 is conductive and positive current conducts between points 82 and 84 via diode 74, transistor 80, and diode 78 and negative current conducts between points 82 and 84 via diode 72, transistor 80 and diode 76. When no gate signal is applied to the base of transistor 80, transistor 80 is non-conductive and current cannot conduct between points 82 and 84. While a particular configuration has been illustrated in FIG. 9 for the solid state switches 18, 20, 22 and 24 of the present invention, it should be apparent that various other solid state bidirectional switches could be utilized without departing from the scope of the present invention. For example, a complimentary pair of PNP and NPN transistors which have their collectors interconnected and their emitters interconnected and have a control lead to the base of each transistor wherein one control lead controls conduction in the positive direction and one control lead controls conduction in the negative direction could be utilized for the solid state switches of the present control. Additionally, other solid state switches and networks utilizing such elements as triacs or FET power transistors could be utilized for the switches of the FIGS. 1 and 2 embodiments.

Figure 3:
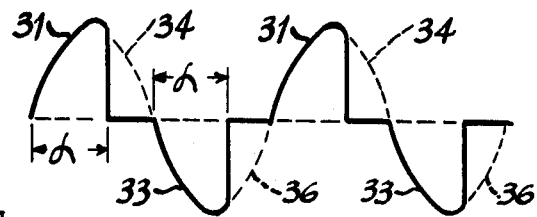
FIG. 3 graphically discloses the effective voltage applied to the first set of windings with the conduction and delay angles being equal for both sets of windings.
Figure 4:
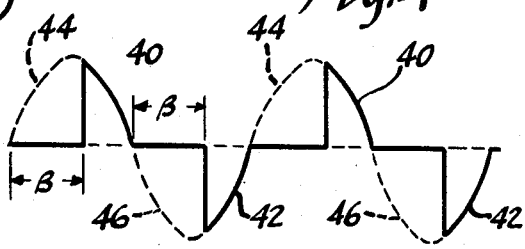
FIG. 4 graphically discloses the effective voltage applied to the second set of windings with the conduction and delay angles being equal for both sets of windings.

FIGS. 3-6 graphically portray the voltage and current curves which occur in the windings 12 and 14 in response to the alternative and cyclic conduction of switches 18 and 20. In the simplest case, as is illustrated in FIGS. 3-6, the start winding 12 is connected to the AC power line only during the first quarter and third quarter of each cycle of the AC wave form and the run winding 14 is connected only during the second quarter and fourth quarter of each cycle of the AC input. FIG. 3 illustrates the voltage applied to the start winding 12. As is illustrated in FIG. 3, alpha is the period during which switch 18 conducts and winding 12 is energized from the AC power line. In the simplest case indicated in FIG. 3, alpha represents a conduction period of 90° during the first and third quarters of each cycle of the AC input. The solid lines at 31 and 33 in FIG. 3 represent the voltage on winding 12 during the positive first quarter and negative third quarter, respectively, of each cycle of the AC input. During the dotted line portions represented by lines 34, 36 switch 18 is non-conductive and the voltage on winding 12 is zero. Thus, it can be seen that the AC wave form on the input is connected to the start winding 12 only during the first and third quarters of each full cycle. FIG. 4 illustrates the voltage applied to the run winding 14 and illustrates voltage being applied from the AC power line after a delay period indicated as beta which is equal to the period during which switch 18 conducts. Switch 20 conducts during the second and fourth quarters of the AC cycle. In this simple case, beta represents a conduction delay period of 90° and switch 20 conducts during the second and fourth quarters of each cycle of the AC input. The solid lines at 40, 42 in FIG. 4 represent the voltage on winding 14 when switch 20 conducts during the positive second quarter and negative fourth quarter of each cycle of the AC input. During the dotted line portions represented by lines 44, 46, switch 20 is non-conductive and the voltage on winding 14 is zero.

Figure 5:
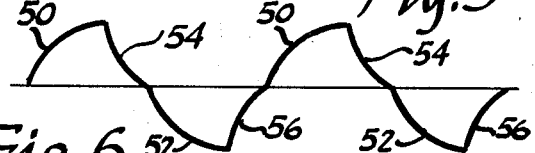
FIGS. 5 and 6 graphically disclose the resultant currents in the first and second set of windings, respectively, when they are energized with voltages according to FIGS. 3 and 4.

FIG. 5 illustrates the current in the start winding 12. It should be apparent that full current is applied to the start winding 12 ring the first and third quarters of the cycle of the AC wave form indicated at 50 and 52, respectively, while during the second and fourth quarters indicated at 54 and 56, respectively, the current in the winding 12 gradually decays toward zero as the inductive energy in winding 12 gradually decreases due to the conduction of the "free wheeling" switch 22 which shorts winding 12.

Figure 6:
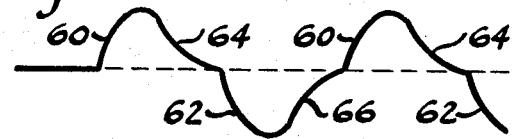

FIG. 6 illustrates the current in the run winding 14. It should be appreciated that full current is applied only during the second and fourth quarters of the AC cycle indicated at 60, 62, respectively, and that during the first and third quarters indicated at 64, 66, respectively, the inductive energy stored in the run winding 14 decays through the free wheeling switch 24 which shorts winding 14 and which is rendered conductive when switch 20 ceases conduction.

In the simplest example illustrated the controller 26 senses the AC power line wave form and causes the switch 18 to conduct during the first and third quarters and the switch 20 to conduct during the second and fourth quarters. The free wheeling switches 22 and 24 are caused to conduct by the controller 26 when switches 18 and 20, respectively, are non-conductive. Switches 18 and 20 are controlled by the controller in this case so that their periods of conduction are not coextensive. It should be apparent that the application of the illustrated wave forms in FIGS. 3-6 to the windings 12 and 14 of the motor 10 will establish magnetic fields in each of the windings 12 and 14, the resultant sum of which results in a rotating field which transverses the two poles of the motor during each full cycle of the AC line. Thus, it should be apparent that the present invention replaces the capacitor, inductance and/or resistance which is utilized in the prior art for establishing a rotating field to start or run a single phase induction motor. The use of the solid state switches 18, 20 causes the magnetic field in the start winding 12 to pulsate (at the AC power line frequency) with the maximum occurring a brief time earlier than (as well as "in between" mechanically) the field of the running winding 14. Thus, the start field 12 is decreasing while the run field 14 is increasing, and increasing negatively while the run field 14 is decreasing. It should be noted that "increasing" and "decreasing" are used above to indicate general trends through a period of conduction or non-conduction. During brief fractions of such period, the current and field may change oppositely, especially at the beginning and end of the period. Nevertheless, these impose only minor imperfections on the increases and decreases which coordinate to produce a rotating magnetic field.

Figure 7:
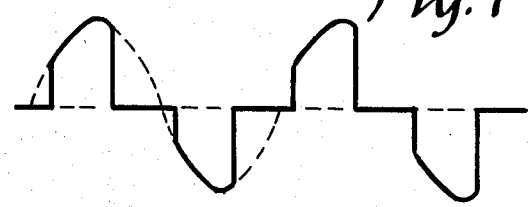
FIGS. 7 and 8 disclose more sophisticated voltage wave forms which may replace the voltage wave forms of FIGS. 3 and 4, respectively, for less costly and less accurate control wherein the conduction and delay angles are not equal.
Figure 8:
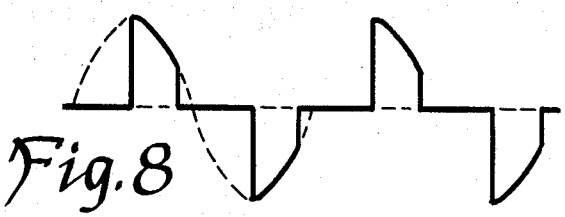

FIGS. 7 and 8 illustrate more complicated voltage wave forms which can be applied to windings 12 and 14, respectively, of the circuitry of FIG. 1 in substitution for the wave forms illustrated in FIGS. 3 and 4. The voltage curve of FIG. 7 would be applied to the start winding 12 while the voltage curve illustrated in FIG. 8 would be applied to the run winding 14. In the voltage curves shown in FIGS. 7 and 8, the period of conduction of switch 18 is longer than the period of conduction of switch 20. Also, switch 18 is conductive for a portion of the period that switch 20 is conductive. Such wave forms could be used where the conduction of switch 18 overlaps the conduction of switch 20 if controller 26 properly controls the conduction of the switches. Such wave forms would be a "poor control" but would work to run motor 10. This situation is illustrated to indicate that a small conduction overlap of the switches 18, 20 is permissible in situations where less costly and less accurate controls are required. In addition, in certain situations it would be permissible to have a slight delay between the end of conduction of switch 18 and the beginning of conduction of switch 20. Such wave forms would be desirable if it were desired to reduce power consumption of the motor 10 at light loads. Also, the period of conduction of the switches 18, 20 could be reduced to reduce the power consumption of the motor 10. In special cases, where it is desired to reduce cost and the efficiency of the control 16, one winding may even be continuously energized with the other winding being energized for discrete time periods to establish the rotating magnetic field in the motor 10.

Figure 2:
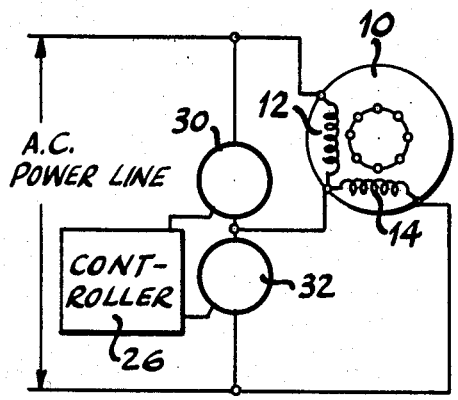
FIG. 2 is a schematic diagram of another preferred embodiment of the control apparatus.

FIG. 2 illustrates another embodiment of the present invention and portions similar to that illustrated in FIG. 1 have been identified with like numerals. Switch 30 is provided for controlling energization of the winding 14 and switch 32 is provided for providing energization of winding 12. Switch 30 is series connected with winding 14 and switch 32 is series connected with winding 12. Both switches 30, 32 have their gates connected to the controller 26 which periodically and alternately affects energization of switches 30,32. Energization of switch 30 will provide for a power flow from the AC line through the switch 30, through field 14 and back to the AC line. Energization of switch 32 will provide for the flow of power from the AC power line, through winding 12, through switch 32 and back to the AC power line. In this embodiment it should be apparent that switches 30 and 32 cannot be simultaneously conducting as a shoot-through would occur. The voltage graphs illustrated in FIGS. 3-6 are applicable to the embodiment illustrated in FIG. 2. FIG. 2 has the additional advantage over the circuitry disclosed in FIG. 1 in that "free wheeling" devices such as the switches 22, 24 are not necessary in the embodiment illustrated in FIG. 2. FIG. 2 provides a current decay path from a winding in which the applied voltage is zero. For example, if switch 30 is energized and full voltage is applied to winding 14, the inductive energy in winding 12 can "free wheel" and decay toward zero, as is illustrated in FIG. 5, through the conducting switch 30 which effectively shorts winding 12 when it is conducting. If switch 32 is conducting and applying full power to winding 12, then the inductive energy stored in winding 14 is allowed to "free wheel" and decay toward zero, as is illustrated in FIG. 6, through conducting switch 32 which effectively shorts winding 14 when it is conducting.

An alternative method of control would use the circuitry of FIGS. 1 or 2 but continuously energize one winding with the switch 18 in FIG. 1 or the switch 32 in FIG. 2 ulitized to produce the current which peaks earlier or later than the current in the other winding which is continuously energized by the power line. In this method, either switch 20 and its associated free wheeling switch 24 or switch 30 could be eliminated and winding 14 directly connected to the AC power line. Such a construction would provide a less costly control with a reduction in efficiency but could be useful where cost is a major factor.

From the foregoing, it should be apparent that a new and improved control for a single phase AC induction motor has been provided. The control utilizes the application of different partial sine waves of voltages to the run and start windings so as to produce a rotating magnetic field in the induction motor. The control includes a single phase AC input and first and second solid state switch means for interconnecting the first and second sets of windings of the AC motor with the single phase input. The first switch means when conductive applies energy to the first set of windings and when non-conductive prohibits the application of energy from the AC power line to the first set of windings. The second switch means when conductive applies energy from the AC power line to the second set of windings and when non-conductive prevents the application of energy from the AC power line to the second set of windings. A controller is provided which is responsive to the single phase AC wave form applied to the input for controlling the conduction of the first and second switch means and rendering each of the first and second switch means alternately and cyclically conductive for discrete time periods during each cycle of a single phase AC wave on the input.

Figure 10:
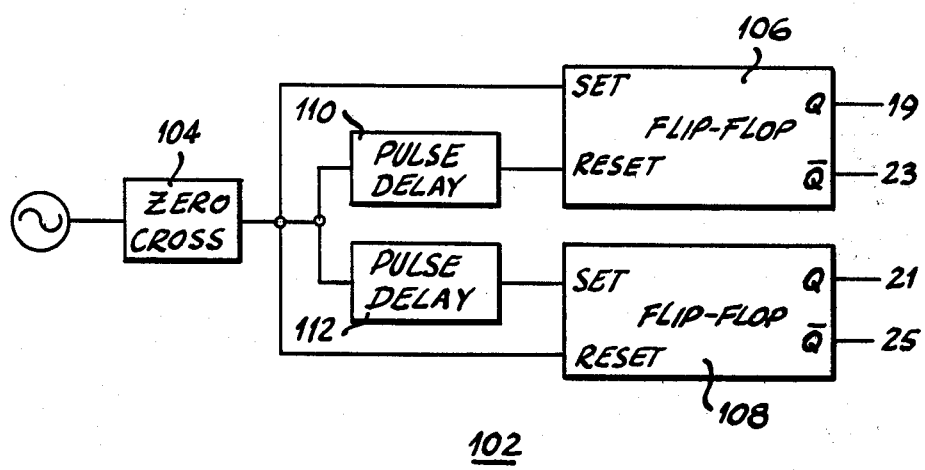
FIG. 10 is a schematic circuit diagram illustrating the timing control for the circuit of FIG. 1.

FIG. 10 shows timing control circuitry 102 for controller 26, FIG. 1. A zero crossing detector 104 generates an output pulse in response to each zero crossing of the AC signal from the AC source and toggles flip-flops 106 and 108 between their Q and $\overline{Q}$ outputs to switch between triggering signals to gates 19 and 23, and 21 and 25, respectively. Flip-flop 106 is also toggled after a delay provided by pulse delay 110, and flip-flop 108 is also toggled after a delay provided by pulse delay 112. In operation, a zero crossing of the AC signal sets flip-flop 106 such that its $\overline{Q}$ output goes high and gate 19 is turned on to render switch 18 conductive, energizing winding 12 during the alpha time period, FIG. 3. After a given delay provided by 110, for example 90°, flip-flop 106 is reset such that its Q output goes low and its $\overline{Q}$ output goes high such that gate 23 is turned on to render switch 22 conductive for the above noted free wheeling. If the delay provided by 112 is also 90°, then flip-flop 108 is concurrently set such that its Q output goes low and its $\overline{Q}$ output goes high such that gate 21 is turned on and switch 20 is rendered conductive to energize winding 14 as shown in FIG. 4. At the next zero crossing signal from 104, flip-flop 108 is reset such that its Q output goes low and its $\overline{Q}$ output goes high to turn on gate 25 and render switch 24 conductive to provide the above noted free wheeling. The zero crossing signal from 104 also sets flip-flop 106 such that its $\overline{Q}$ output goes low and its Q output goes high, as above noted, and the cycle continues. Delay 112 may be shorter than delay 110, in which case switches 18 and 20 will have overlapping conduction periods. Delay 112 may be longer than delay 110, in which case there will be a gap between conduction periods of switches 18 and 20 during which both switches 18 and 20 are off. In the embodiment in FIG. 2, only flip-flop 106 is used and its Q and $\overline{Q}$ outputs control the gates to switches 30 and 32. In the alternative embodiment of FIG. 1 eliminating switches 20 and 24, only flip-flop 106 is used.

We claim:

1. A control apparatus for establishing a rotating field in a single phase AC induction motor having a rotatable output and first and second sets of mechanically displaced windings which are energized alternately and cyclically by a single phase AC input to establish a rotating field to effect rotation of the output without phasing capacitors or inductors comprising, a single phase AC input which is adapted to have a single phase AC wave form applied thereto, first solid state switch means for interconnecting said first set of windings of said AC motor and said single phase AC input, second solid state switch means for interconnecting said second set of windings of said AC motor and said single phase AC input, said first switch means when conductive applying AC energy from said input to said first set of windings, said second switch means when conductive applying AC energy from said input to said second set of windings of said AC motor, said first switch means when non-conductive preventing the application of energy from said input to said first set of windings, said second switch means when non-conductive preventing the application of energy from said input to said second set of windings and controller means responsive to said single phase AC wave form applied to said input for controlling the conduction of said first and second switch means and rendering each of said first and second switch means alternately and cyclically conductive for discrete time periods during each cycle of the single phase AC wave form on said input.

2. A control apparatus as defined in claim 1 wherein said first set of windings in said AC induction motor is connected in series with said first solid state switch means and said second set of windings of said AC induction motor is disposed in series with said second solid state switch means.

3. A control apparatus as defined in claim 1 wherein the discrete time period for which said first switch means conducts is not coextensive with the discrete time period for which said second switch means conducts.

4. A control apparatus as defined in claim 3 wherein the current in one of said first and second windings is increasing and the current in the other of said first and second windings is decreasing during each discrete time period.

5. A control apparatus as defined in claim 1 wherein said controller means renders said first and second switch means alternately and cyclically conductive for discrete time periods during each cycle to enable said first and second switch means to apply a distorted segmental sine wave to said first and second sets of windings to establish a rotating magnetic field in said AC induction motor.

6. A control apparatus as defined in claim 4 wherein said controller means renders said first and second switch means alternately and cyclically conductive for discrete time periods during each cycle to enable said first and second switch means to apply distorted segmental sine waves to said first and second sets of windings to establish a rotating magnetic field in the AC induction motor.

7. A control apparatus as defined in claim 4 wherein said controller means renders said first and second switch means alternately and cyclically conductive for discrete time periods during each cycle to enable said first and second switch means to apply distorted segmental sine waves to said first and second sets of windings to establish a rotating magnetic field in the AC induction motor.

8. A control apparatus as defined in claim 4 wherein each of said solid state switch means comprises a transistor having its base connected to said controller means for controlling the conduction of said transistor and a diode rectifier bridge for allowing current flow in both directions through said transistor when said transistor is rendered conductive by the application of a gating signal to the base of the transistor from said controller means.

9. A control apparatus for establishing a rotating field in a single phase AC induction motor having a rotatable output and first and second sets of mechanically displaced windings which are energized by a single phase AC input to establish a rotating field to effect rotation of the output without phasing capacitors or inductors comprising, a single phase AC input which is adapted to have a single phase AC wave form applied thereto, solid state switch means for interconnecting said first set of windings of said AC motor and said single phase AC input, means for connecting said second set of windings continuously to said single phase AC input, said first switch means when conductive applying AC energy from said input to said first set of windings and when non-conductive, preventing the application of energy from said input to said first set of windings, and controller means responsive to said single phase AC wave form applied to said input for controlling the conduction of said switch means for rendering said switch means cyclically conductive for discrete time periods during each cycle of the single phase AC wave form on said input and wherein the current in the second set of windings which are continuously energized lags or leads the current in the first set of windings, which is cyclically energized for discrete time periods, during each of said discrete time periods.

10. A control apparatus as defined in claim 9 wherein said first set of windings in said AC induction motor is connected in series with said first solid state switch means.

11. A control apparatus as defined in claim 10 wherein the current in one of said first and second windings is increasing and the current of said first and second windings is decreasing during each discrete time period.

12. A control apparatus as defined in claim 11 wherein said controller means renders said solid state switch means cyclically conductive for discrete time periods during each cycle of a single phase AC wave form on the input to enable a distorted, segmental sine wave to be applied to said first set of windings to establish a rotating magnetic field in the AC induction motor.

13. A control apparatus for establishing a rotating field in a single phase AC induction motor having a rotatable output and first and second sets of mechanically displaced windings which are energized alternately and cyclically by a single phase AC input to establish a rotating field to effect rotation of the output comprising, a single phase AC input which is adapted to have a single phase AC wave form applied thereto, first solid state switch means for interconnecting said first set of windings of said AC motor and said single phase AC input, second solid state switch means for interconnecting said second set of windings of said AC motor and said single phase AC input, said first switch means when conductive applying AC energy from said input to said first set of windings, said second switch means when conductive applying AC energy from said input to said second set of windings of said AC motor, said first switch means when non-conductive preventing the application of energy from said input to said first set of windings, said second switch means when non-conductive preventing the application of energy from said input to said second set of windings and controller means responsive to said single phase AC wave form applied to said input for controlling the conduction of said first and second switch means and rendering each of said first and second switch means alternately and cyclically conductive for discrete time periods during each cycle of the single phase AC wave form on said input, and comprising switching said first switch means to said conductive state and switching said second switch means to said non-conductive state at a zero crossing of said AC wave form then switching said first switch means to said non-conductive state after a given delay and before the first successive next zero crossing and switching said second switch means to said conductive state after another delay and before said first successive next zero crossing, then switching said first switch means to said conductive state and switching said second switch means to said non-conductive state at said first successive zero crossing, then switching said first switch means to said non-conductive state after said one delay and switching said second switch means to said conductive state after said other delay, then switching said first switch means to said conductive state and switching said second switch means to said non-conductive state at the second successive zero crossing of said AC wave form, then switching said first switch means to said non-conductive state after said one delay and switching said second switch means to said conductive state after said other delay, then switching said first switch means to said conductive state and switching said second switch means to said non-conductive state at the third successive zero crossing of said AC wave form, and so on, such that one portion of the first half cycle of said AC wave form corresponds to a like chopped wave form in said first set of windings, another portion of the first half cycle of said AC wave form corresponds to a like chopped wave form in said second set of windings, one portion of the second half cycle of said AC wave form corresponds to a like chopped wave form in said first set of windings, and another portion of the second half cycle of said AC wave form corresponds to a like chopped wave form in said second set of windings, whereby said one portions of the first and second half cycle wave forms of said AC signal are provided in said first set of windings, and said other portions of the first and second half cycle wave forms of said AC signal are provided in said second set of windings.

14. A control apparatus for establishing a rotating field in a single phase AC induction motor having a rotatable output and first and second sets of mechanically displaced windings which are energized by a single phase AC input to establish a rotating field to effect rotation of the output comprising, a single phase AC input which is adapted to have a single phase AC wave form applied thereto, solid state switch means for interconnecting said first set of windings of said AC motor and said single phase AC input, means for connecting said second set of windings continuously to said single phase AC input, said first switch means when conductive applying AC energy from said input to said first set of windings and when non-conductive, preventing the application of energy from said input to said first set of windings, and controller means responsive to said single phase AC wave form applied to said input for controlling the conduction of said switch means for rendering said switch means cyclically conductive for discrete time periods during each cycle of the single phase AC wave form on said input and wherein the current in the second set of windings which are continuously energized lags or leads the current in the first set of windings, which is cyclically energized for discrete time periods, during each of said discrete time periods, and comprising switching said switch means to one of said conductive and non-conductive states at a zero crossing of said AC wave form, then switching said switch means to the other of said states after a given delay and before the first successive next zero crossing of said AC wave form then switching said switch means to said one state at said first successive zero crossing of said AC wave form, then switching said switch means to said other state after said given delay, then switching said switch means to said one state at the second successive zero crossing of said AC wave form, then switching said switch means to said other state after said given delay, then switching said switch means to said one state at the third successive zero crossing of said AC wave form, and so on.

* * * * *